United States Patent
Cunningham et al.

(10) Patent No.: US 12,062,960 B2
(45) Date of Patent: *Aug. 13, 2024

(54) METHOD FOR PRODUCING A STATOR FOR AN ELECTRIC MACHINE

(71) Applicant: Mahle International GmbH, Stuttgart (DE)

(72) Inventors: John Cunningham, Muxton Telford (GB); Philip Grabherr, Stuttgart (DE); Ian Webb, Telford (GB); Tim Male, Telford (GB); Stojan Markic, Kojsko (SI); Graham Sentance, Stanford Bridge (GB); Peter Sever, Murska Sobota (SI); Josef Sonntag, Nuertingen (DE); Jon Witcombe, Telford (GB)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 754 days.

This patent is subject to a terminal disclaimer.

(21) Appl. No.: 16/892,241

(22) Filed: Jun. 3, 2020

(65) Prior Publication Data

US 2020/0295615 A1 Sep. 17, 2020

Related U.S. Application Data

(63) Continuation of application No. PCT/EP2018/081563, filed on Nov. 16, 2018.

(30) Foreign Application Priority Data

Dec. 4, 2017 (DE) ...................... 10 2017 221 801.0

(51) Int. Cl.
*H02K 3/24* (2006.01)
*H02K 15/00* (2006.01)
(Continued)

(52) U.S. Cl.
CPC ........... *H02K 3/24* (2013.01); *H02K 15/0093* (2013.01); *H02K 15/026* (2013.01);
(Continued)

(58) Field of Classification Search
CPC ........... H02K 3/24; H02K 15/10; H02K 15/12
See application file for complete search history.

(56) References Cited

U.S. PATENT DOCUMENTS

| 7,705,495 B2 | 4/2010 | Alfermann et al. |
| 10,291,106 B2 | 5/2019 | Takahashi |

(Continued)

FOREIGN PATENT DOCUMENTS

| CH | 413077 A | 5/1966 |
| CN | 101183805 A | 5/2008 |

(Continued)

OTHER PUBLICATIONS

Office Action and Search Report issued Nov. 26, 2021 in Chinese counterpart application No. 201880078084.7 and English-language translation thereof.

(Continued)

*Primary Examiner* — Livius R. Cazan

(74) *Attorney, Agent, or Firm* — Barnes & Thornburg LLP

(57) ABSTRACT

A method for producing a stator for an electric machine includes providing a stator with an annular stator body, from which a plurality of stator teeth protrude radially inwardly, wherein an intermediate space is formed in each case between two stator teeth that are adjacent in a circumferential direction, encapsulating two stator teeth adjacent in the circumferential direction with a first plastic mass, arranging a stator winding on a stator tooth, fixing the stator winding on the stator tooth by encapsulating said stator winding with a second plastic mass, following the encapsulation with the (Continued)

first plastic mass and before the fixing of the stator winding, a first mask is introduced into the intermediate space between the two stator teeth, such that the volume of the intermediate space that is filled with the first mask remains free from the second plastic mass to form a cooling duct during the encapsulation.

25 Claims, 7 Drawing Sheets

(51) Int. Cl.
*H02K 15/02* (2006.01)
*H02K 15/085* (2006.01)
*H02K 15/10* (2006.01)
*H02K 15/12* (2006.01)

(52) U.S. Cl.
CPC ........... *H02K 15/085* (2013.01); *H02K 15/10* (2013.01); *H02K 15/12* (2013.01)

(56) References Cited

U.S. PATENT DOCUMENTS

| | | |
|---|---|---|
| 2008/0042498 A1 | 2/2008 | Beer |
| 2008/0136271 A1 | 6/2008 | Alfermann et al. |
| 2009/0022610 A1 | 1/2009 | Materne et al. |
| 2014/0292118 A1 | 10/2014 | Takahashi |

FOREIGN PATENT DOCUMENTS

| | | |
|---|---|---|
| CN | 103475131 A | 12/2013 |
| CN | 104079096 A | 10/2014 |
| DE | 102006029803 A1 | 1/2008 |
| DE | 102007054364 A1 | 5/2008 |
| EP | 1780872 A2 | 5/2007 |
| JP | 04312333 A | 11/1992 |
| JP | 04364343 A | 12/1992 |
| JP | 06062783 U | 9/1994 |
| JP | 10271738 A * | 10/1998 |
| JP | 2003070199 A | 3/2003 |
| JP | 2014197962 A | 10/2014 |

OTHER PUBLICATIONS

Written Opinion of the International Searching Authority of the European Patent Office in PCT/EP2018/081563 (from which this application claims priority) mailed Feb. 13, 2019 and English-language translation thereof.
International Search Report of the European Patent Office in PCT/EP2018/081563 (from which this application claims priority) mailed Feb. 13, 2019 and English-language translation thereof.
Office Action dated Apr. 27, 2021 issued in Japanese counterpart application No. 2020-529559 and English-language translation thereof.

* cited by examiner

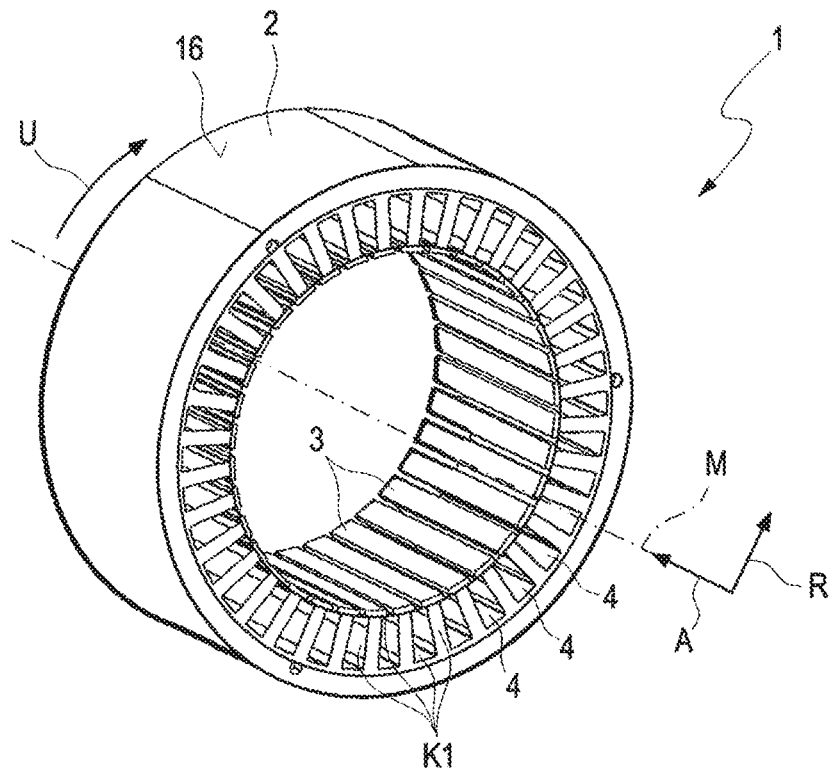
FIG. 2A
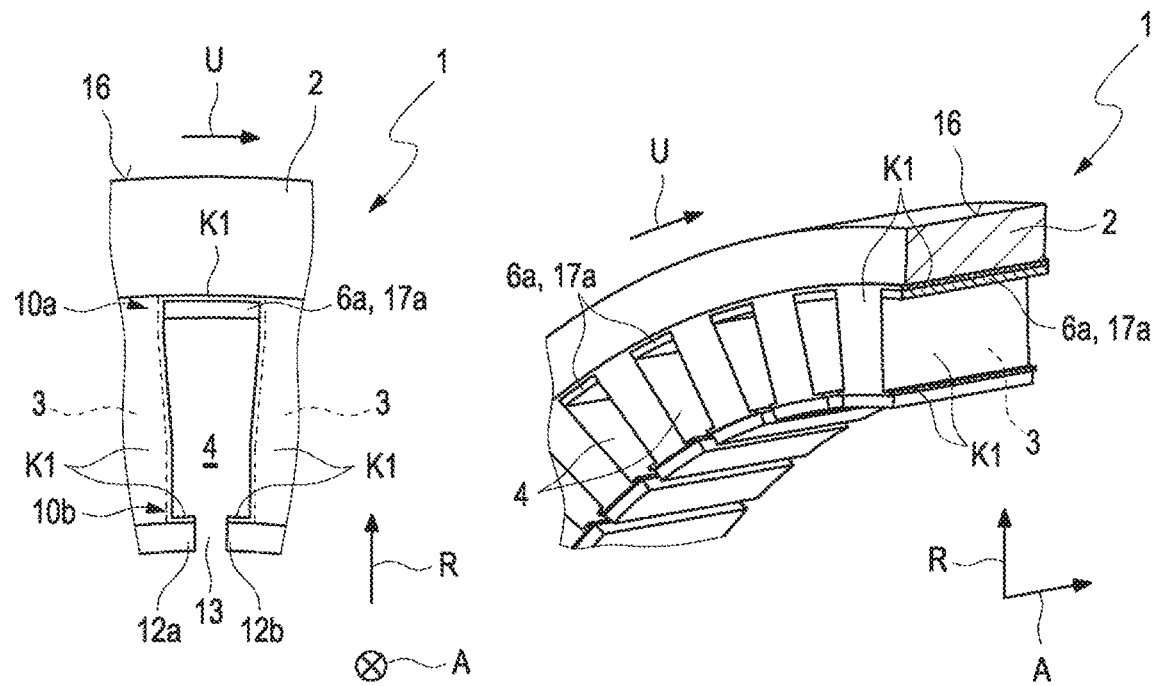
FIG. 2B
FIG. 2C

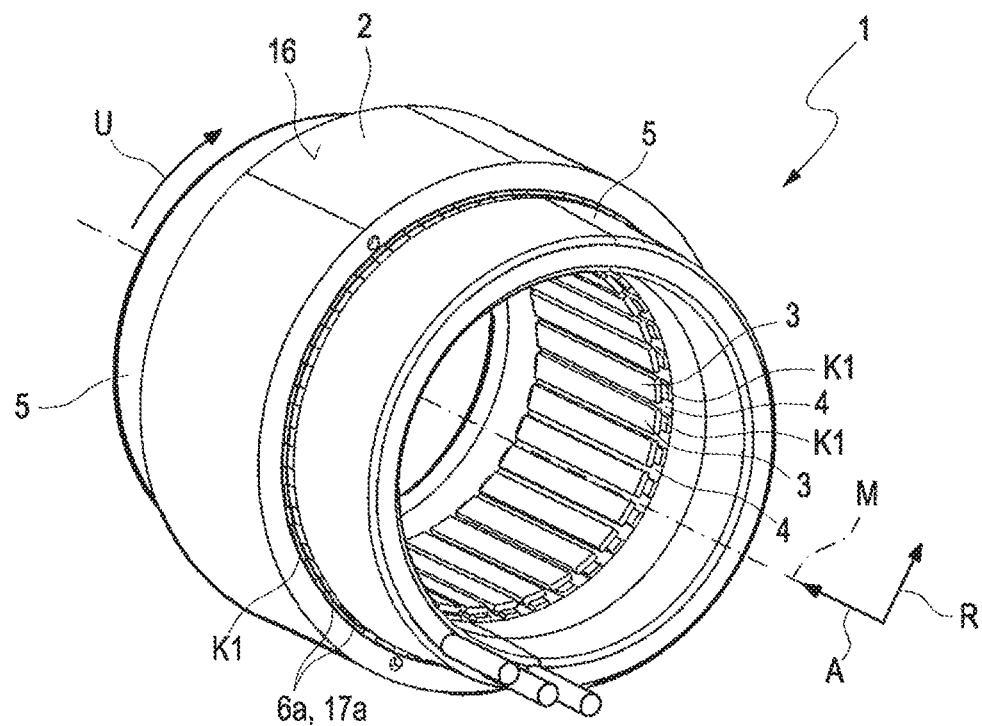
FIG. 3A
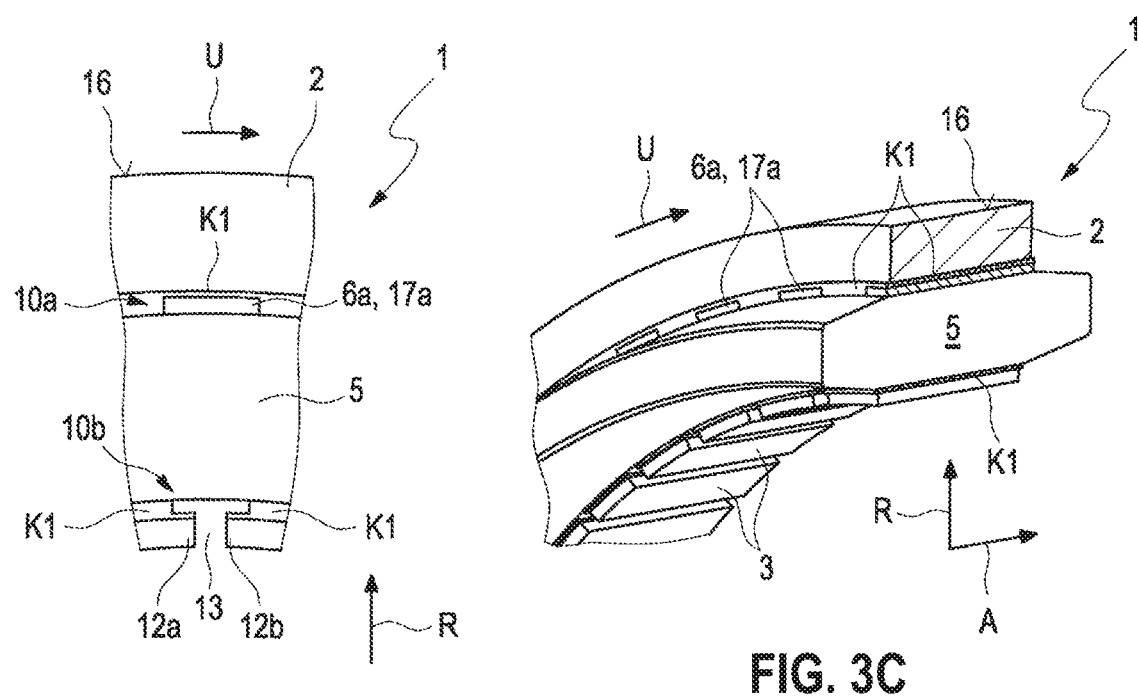
FIG. 3B
FIG. 3C

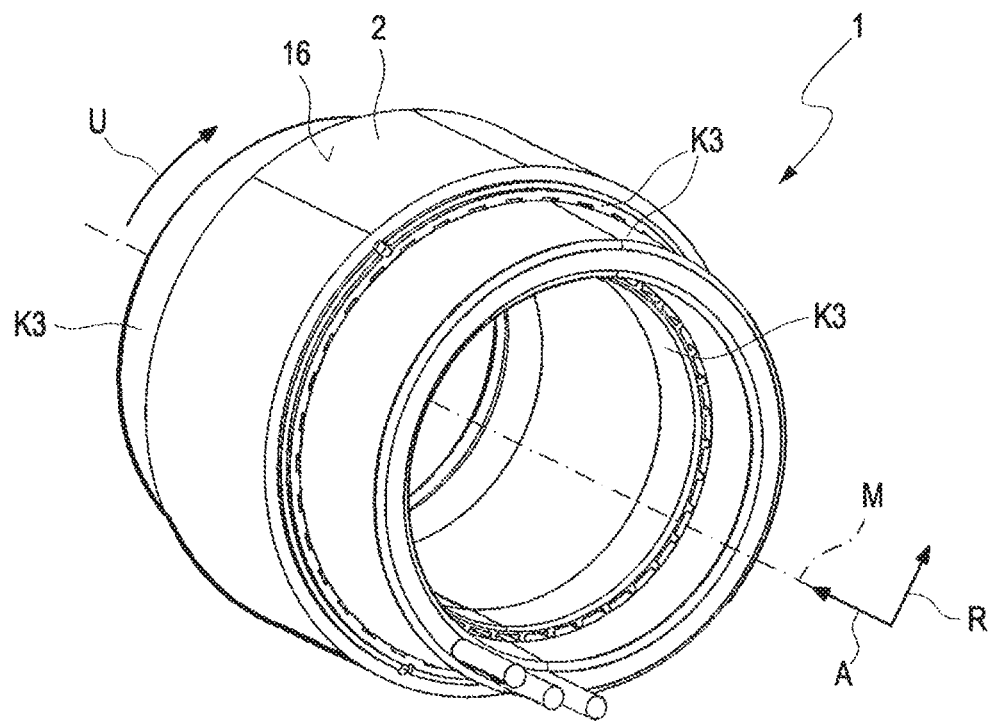
FIG. 5A
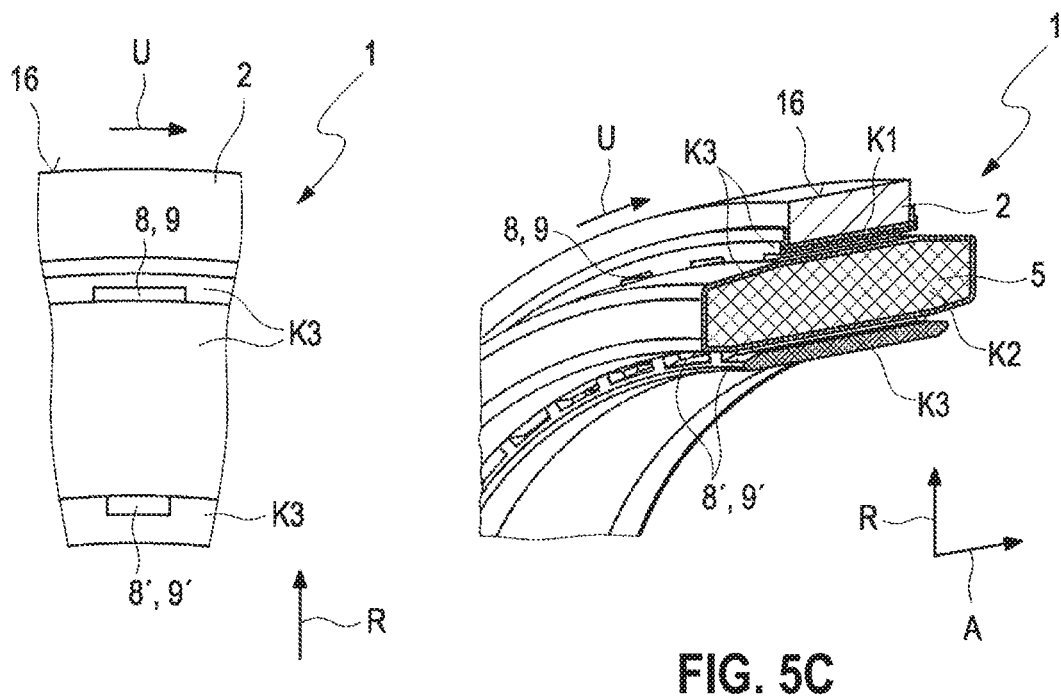
FIG. 5B
FIG. 5C

METHOD FOR PRODUCING A STATOR FOR AN ELECTRIC MACHINE

CROSS REFERENCE TO RELATED APPLICATIONS

This application is a continuation application of international patent application PCT/EP2018/081563, filed Nov. 16, 2018, designating the United States and claiming priority to German application DE 10 2017 221 801.0, filed Dec. 4, 2017, and the entire content of both applications is incorporated herein by reference.

TECHNICAL FIELD

The disclosure relates to a method for producing a stator for an electric machine. The disclosure further relates to a stator that has been produced with this method, and to an electric machine having such a stator.

BACKGROUND

Typically, conventional stators for electric machines include stator windings which, during the operation of the machine, are electrically energised. Such an electric machine can generally be an electric motor or a generator. The electric machine can be configured as an external rotor machine or as an internal rotor machine. During the operation of the machine heat is generated which, for avoiding overheating and damage or even destruction of the stator, has to be dissipated. To this end, it is known from conventional stators to equip the same with a cooling system for cooling the stator—in particular the said stator windings. Such a cooling system includes one or more cooling passages, which are flowed through by a coolant and are arranged near the stator windings. By way of heat transfer from the stator windings to the coolant, heat can be dissipated from the stator. In this way, overheating of the stator windings and, connected with this, damage or even destruction of the stator, can be avoided.

In order to keep the production costs for providing the cooling passages mentioned above low it is known to overmold the core stacks of the stator forming the stator body including the stator teeth carrying the stator windings with a plastic mass and, during the course of the injection molding operation, create the said cooling passages in the plastic mass. During the course of the overmolding, the stator windings wound onto the stator teeth can be permanently fixed on the stator.

The fact that during the overmolding of the stator body and of the windings arranged on the stator teeth it cannot be guaranteed that the windings formed so as to be electrically conductive do not lie against the—likewise electrically conductive—stator body, which are typically formed by electrically conductive shaped metal sheets that are stacked on top of one another proves to be problematic in this connection. However, the electrical connection between stator windings and stator body accompanied by this causes an undesirable electrical short circuit.

This applies also to the case that is usual in practice that the stator windings are already produced with an electrical insulation, since during the operation of the electric machine, because of high temperatures that can be caused by the high electric current flowing through the windings, the electrical insulation can be partly damaged or even destroyed.

Likewise, it cannot be excluded that the stator windings, following the creation of the cooling passages by the injection molding operation with plastic mass, do not protrude into the cooling passages. In the event that the above mentioned electrical insulation of the stator winding is damaged or even destroyed, the stator windings can come into direct contact with the coolant conducted through the cooling passages, which has to be avoided in order to prevent an electrical connection of the stator windings with the coolant.

SUMMARY

It is therefore an object of the present disclosure to provide an improved method for producing a stator with cooling passages, with which the disadvantages mentioned above are largely or even completely overcome.

This object is achieved by a method for producing a stator for an electric machine, a stator, and an electrical machine as described herein.

A method for producing a stator for an electric machine according to an aspect of the disclosure includes a first step a). According to step a), a stator is provided which includes an annular stator body from which in turn multiple stator teeth arranged spaced apart from one another in a circumferential direction, protrude for receiving stator windings. Between two stator teeth adjacent in the circumferential direction, an intermediate space, the so-called stator slot, is formed in each case.

According to a further step b), at least two stator teeth that are adjacent in the circumferential direction are at least partly overmolded with a first plastic mass. In this way it is additionally ensured that the stator windings still to be wound onto the stator teeth are electrically insulated relative to the electrically conductive stator teeth after the winding operation. For this reason, the circumferential sides of the stator tooth facing the intermediate spaces are preferentially overmolded.

According to a further step c), at least one stator winding is arranged on at least one stator tooth. This operation corresponds to the winding of the stator windings onto the stator teeth. The stator windings can be realized as concentrated or distributed stator windings. According to a further step d), this at least one stator winding is fixed, i.e., permanently fastened to the stator tooth through at least partial overmolding of this stator winding with a second plastic mass.

According to an aspect of the disclosure, a first mask is introduced into the intermediate space between the two stator teeth after the overmolding with the first plastic mass according to step b) and prior to the fixing of the at least one stator winding according to step d). This is carried out in such a manner that the volume of the intermediate space filled out by the first mask for forming a cooling passage remains free of the second plastic mass during the overmolding according to step d).

In the case of a stator produced with the method introduced here, the cooling of the stator windings can thus be effected by the transport of waste heat generated in the stator windings, in particular in their axial end portions, through the first, second and/or third plastic mass to the coolant passages formed in the stator body. There, the waste heat is absorbed by the coolant flowing through the coolant passages.

Typically, the procedure described above is applied to a plurality of the stator teeth and to a plurality of the stator windings. Particularly typical, the procedure described above is applied to all stator teeth that are present in the stator body and to all stator windings that are arranged on the stator teeth.

According to an exemplary embodiment of the method, the first mask covers a surface portion of the stator body bounding the intermediate space radially outside, which in step b) can have been partly or completely covered with the first plastic mass, so that the surface portion in step d) is not covered by the second plastic mass. Thus, the first plastic mass can be used for the electrical insulation of the stator body. At the same time, the first mask keeps the volume required for forming a cooling passage during the fixing of the stator windings with the second plastic mass, free.

According to an exemplary embodiment, the first mask is introduced into a radially outer end portion of the intermediate space concerned. This region of the intermediate space is particularly suited for creating a cooling passage, since the stator windings generate particularly much waste heat in the region of the radially outer end portion.

Particularly practically, the first mask completely fills out the radially outer end portion following the introduction into the radially outer end portion of the intermediate space. Particularly typically, the first mask lies flat, at least in portions, against the first plastic mass bounding the radially outer end portion.

According to an advantageous further development, the method includes an additional method step e), according to which the first mask, following the overmolding with the second plastic mass, is again removed from the intermediate space. In this way, a hollow space formed following the removal of the first mask, forms a coolant passage for coolant to flow through.

According to a further exemplary embodiment, the method includes an additional method step f). According to step f), the second plastic mass bounding a hollow space or a coolant passage and—alternatively or additionally, the stator windings fixed on the stator tooth with the second plastic mass and—alternatively or additionally—a surface portion of the stator body covered by the first mask prior to the removal of the same, is overmolded with a third plastic mass. This is typically performed in such a manner that the hollow space or coolant passage following the overmolding with the third plastic mass is exclusively bounded by the third or first plastic mass.

Practically, the overmolding with the third plastic mass takes place after the removing of the first mask. Any stator windings protruding out of the second plastic mass are in this manner insulated from the coolant flowing through the coolant passage. Typically, the same procedure can be applied to a plurality of the existing hollow spaces or coolant passages. Particularly typically, the same procedure can be applied to all of the existing hollow spaces or coolant passages.

Typically, following the carrying out of step f), the coolant passage concerned is thus exclusively bounded by the first or by the third plastic mass. An impermissible electrical/mechanical contact of the stator windings or of the stator body with the coolant is prevented in this manner.

Particularly typically, the overmolding with the first or third plastic mass is effected in such a manner that following the overmolding the hollow space or coolant passage is no longer bounded at any point directly by a stator winding and/or by the stator body. An impermissible electrical/mechanical contact of the stator windings with the coolant is excluded in this manner.

According to another exemplary embodiment, a second mask is introduced into a radially inner end portion of the intermediate space following the overmolding with the first plastic mass according to step b) and prior to the fixing of the at least one stator winding according to step d). In this way it is ensured that the volume of the intermediate space for forming an additional cooling passage filled out by the second mask remains free of the second plastic mass during the overmolding according to step d). This region of the intermediate space also proves to be particularly advantageous for creating a cooling passage since in the region of the radially inner end portion the stator windings generate particularly much waste heat.

Particularly typically, the second mask covers a surface portion of the two stator teeth radially bounding the intermediate space inside, which in step b) can have been partly or completely covered with the first plastic mass. In this way it is ensured that the surface portion in step d) is not covered with the second plastic mass.

According to an exemplary embodiment, at least two stator teeth adjacent in the circumferential direction of the stator body provided in step a) includes, in each case at an end portion facing away from the stator body, at least one extension protruding in the circumferential direction. In this exemplary embodiment, the two extensions of the stator teeth that are adjacent in the circumferential direction lie opposite one another in the circumferential direction. In this way, the two extensions, forming a passage slot, bound the intermediate space formed between the stator teeth partly radially inside.

Typically, the procedure described above is applied to a plurality of the stator teeth and to a plurality of the stator windings. Particularly typically, the procedure described above is applied to all of the stator teeth that are present in the stator body and to all stator windings that are arranged on the stator teeth.

According to a further exemplary embodiment, the method can include a further additional method step e1). According to this step e1), the second mask, following the overmolding with the second plastic mass, is removed from the passage slot. Thus, the hollow space created following the removal of the second mask forms an additional coolant passage for coolant to flow through.

According to a further advantageous further development, the method can include a further additional method step f1). According to the additional method step f1), the second plastic mass bounding the additional coolant passage and—alternatively or additionally—the stator winding fixed to the stator tooth with the second plastic mass and—alternatively or additionally—the surface portion of the stator teeth covered by the second mask prior to the removal of the same, is overmolded with a third plastic mass. In this further development this is effected in such a manner that the additional coolant passage following the overmolding with the third plastic mass K3 is exclusively bounded by the third or first plastic mass K3 and K1.

In this way, any stator windings protruding from the second plastic mass are insulated from the coolant flowing through the coolant passage.

Particularly typically, the additional coolant passage is exclusively bounded by the third plastic mass. An impermissible electrical contact of the stator windings with the coolant is excluded in this way.

Practically, the overmolding with the third plastic mass is effected in such a manner that following the overmolding, the hollow space or coolant passage is not directly bounded at any point by the stator winding and/or by the stator body. In this way, an impermissible electrical contact of the stator windings with the coolant is prevented.

Typically, the second mask is configured in such a manner that it does not only fill out the passage slot formed between the two stator teeth that are adjacent in the circumferential direction, but additionally protrudes radially to the outside into the remaining intermediate space between the two stator teeth. In this version, the second mask additionally fills out a radially inner end portion of the intermediate space following the passage slot.

The first and/or second mask proves to be particularly producible and thus cost-effective when the same are formed by way of an insert preferentially formed plate-like or platelet-like, particularly of steel.

According to an advantageous further development, the method can include a further additional method step g), according to which at least one outer circumferential side of the stator body can be overmolded with a fourth plastic mass.

According to an advantageous further development, axially extending extensions which are also provided on the outer circumferential side of the stator body during the overmolding according to step g) are also overmolded with the fourth plastic mass, of which axially on the end side threaded rods, for fastening a respective bearing shield to the stator body, protrude in each case.

According to another exemplary embodiment, two bearing shields located axially opposite one another are fastened to the stator body with the overmolded threaded rods in an additional method step. This is carried out in such a manner that a first bearing shield seals a first hollow space provided in the third and/or fourth plastic mass, which forms a coolant distributor and for this purpose fluidically communicates with the existing cooling passages. The fastening is additionally carried out in such a manner that a second bearing shield seals a second hollow space provided in the third and/or fourth plastic mass, which forms a coolant collector and for this purpose fluidically communicates with the existing cooling passages. The two bearing shields can be formed in the manner of end plates, which are located opposite one another in the axial direction and axially extend the stator body. In one or in both bearing shields, a recess can be provided which expands the respective hollow space provided in the third and fourth plastic mass.

In the following, various exemplary embodiments relating to the material properties of the different plastic masses are introduced. Concerning the desired material properties, it should be noted that basically plastic masses with high heat conductivity, high strength and high coolant resistance would be desirable. Plastics having all these material properties however are very expensive. For this reason, material combinations are explained in the following, in which the respective plastic mass only has material properties that are required for fulfilling the respective function. For example, it is not required that the fourth plastic mass, which is only provided on the stator on the outside and fulfils a housing function, has a high heat conductivity. It is rather sufficient when the fourth plastic mass has a high mechanical strength. Compared with this, the third plastic mass, which directly bounds the cooling passages, should have a high coolant resistance since it comes into direct contact with the respective coolant flowing through the cooling passage. Similar applies to the first plastic mass, which can likewise bound the cooling passages and thus come into contact with the coolant. The second plastic mass, in which the individual stator windings are arranged, should have as high as possible a heat conductivity in order to be able to effectively dissipate the heat produced by the stator windings.

The thermal conductivity of both thermosetting plastic and also thermoplastic is adjustable by the choice of the material composition. Thus, the thermal conductivity of a thermoplastic can be equal or greater than that of a thermosetting plastic and vice versa. Usage of thermoplastics has various advantages compared with the use of thermosetting plastics. For example, thermoplastics, as a consequence of the reversible shaping process applied during its processing are better recyclable or compared with thermosetting plastics, are less brittle and have improved damping properties. Since thermoplastics however are usually more expensive in procurement than thermosetting plastics, thermoplastics have to be employed selectively.

According to an exemplary embodiment, the first and/or the second and/or the third and/or the fourth plastic mass includes a thermoplastic or is a thermoplastic in order to exploit the abovementioned advantages.

A further exemplary embodiment provides that the first and/or the second and/or the third and/or the fourth plastic mass includes a thermosetting plastic or is a thermosetting plastic, by way of which the cost advantages mentioned above can be exploited.

According to a further exemplary embodiment, the plastic material of the first, second and/or third plastic mass therefore includes a thermosetting plastic or is a thermosetting plastic. In contrast with this, the plastic material of the fourth plastic mass in this exemplary embodiment includes a thermoplastic or is a thermoplastic.

According to an advantageous further development, the heat conductivity of the fourth plastic mass is lower than the heat conductivity of the first, second and/or third plastic mass.

According to a further advantageous further development, a coolant resistance of the third plastic mass is greater than the coolant resistance of the second or first plastic mass.

According to a further advantageous further development, the heat conductivity of the first and of the second plastic mass is higher than the heat conductivity of the third and of the fourth plastic mass.

According to another exemplary embodiment, the plastic material of the first and second and third plastic mass includes a thermoplastic or is a thermoplastic. Compared with this, the plastic material of the fourth plastic mass in this exemplary embodiment is a thermosetting plastic that is distinct from the thermoplastic of the first, second and third plastic mass.

According to an advantageous further development, the heat conductivity of the fourth plastic mass is lower than the heat conductivity of the first and/or second and/or third plastic mass. Alternatively or additionally, the strength of the fourth plastic mass in this exemplary embodiment is higher than the strength of the first and/or second and/or third plastic mass.

According to another exemplary embodiment, the plastic material of the first and of the third plastic mass includes the same thermoplastics or consists of the same thermoplastics, whereas it is distinct from the plastic material of the second and of the third plastic mass. In this exemplary embodiment, the plastic material of the second plastic mass is distinct from the plastic material of the fourth plastic mass.

According to an advantageous further development, a coolant resistance of the first and/or third plastic mass is higher than the coolant resistance of the second and/or fourth plastic mass. Alternatively or additionally, the heat conductivity of the first and/or third plastic mass in this further development is lower than the heat conductivity of the second plastic mass. Alternatively or additionally, the strength of the fourth plastic mass in this further development is higher than the strength of the first and/or second and/or third plastic mass.

Practically, the layer thickness of the third and/or first plastic mass bounding the respective cooling passage amounts to a maximum of 0.8 mm, preferentially a maximum of 0.3 mm.

According to a further exemplary embodiment, the plastic materials of the first, second, third, and fourth plastic mass include different thermoplastics or thermosetting plastics or consist of different thermoplastics or thermosetting plastics.

According to an advantageous further development, a coolant resistance of the first and/or third plastic mass is higher than a coolant resistance of the second plastic mass. Alternatively or additionally, the heat conductivity of the second plastic mass in this further development is higher than the heat conductivity of the first and/or third and/or fourth plastic mass. Alternatively or additionally, the strength of the fourth plastic mass in this further development is higher than the strength of the first and/or second and/or third plastic mass.

According to a further exemplary embodiment, the method includes two additional method steps h1 and h2. According to the additional method step h1, a coolant distribution space and a coolant collection space are provided on and/or in the stator, which via the at least one coolant passage and/or the at least one additional coolant passage fluidically communicate with one another. The coolant distribution space serves for distributing the coolant over the cooling passages, the coolant collection space for collecting the coolant following the flow through the cooling passages. The coolant distributor and the coolant collection space can be arranged in the axial extension of the stator body and lie opposite one another along the axial direction. The coolant distribution space and the coolant collection space can be arranged or formed at least partly in the second plastic mass. Although the electrically conductive stator windings are usually surrounded with an electrical insulation even during their production in order to prevent that upon contact individual winding portions with one another, electrical short circuits are created. However, it cannot be ensured that following the manufacture and assembly of the stator windings, all these windings are continuously equipped with such an insulation. According to the additional method step h2, the second plastic mass bounding the coolant distribution space and/or the coolant collection space and/or the axial end portions of at least one stator winding, preferentially all stator windings present in the stator, are therefore overmolded and/or sprayed with an electrically insulating insulation material. Typically, an electrically insulating varnish is used for this purpose. Alternatively or additionally, a plastic mass, in particular the third plastic mass and/or the fourth plastic mass, can also be used. In this way, an undesirable electrical short circuit of the coolant present in the coolant distribution space or in the coolant collection space with the electrically conductive stator windings can be prevented.

Particularly, the overmolding or spraying according to step h2) is carried out in such a manner that following the overmolding or spraying neither the second plastic mass nor the axial end portions of the at least one stator winding, preferentially of all stator windings, directly bound the coolant distribution space or the coolant collection space. In this way, an undesirable electrical connection of the electrically conductive stator windings with the coolant present in the coolant distribution space or coolant collection space is excluded.

Particularly typically, the axial end portions of the at least one stator winding are fixed on the at least one stator tooth in step d) of the method or offset in time thereto, i.e., prior to carrying out step d) or after carrying out step d), with a plastic mass, preferentially with the second plastic mass.

The disclosure, furthermore, relates to a stator that has been produced with the method explained above. The advantages of the method according to an aspect of the disclosure explained above therefore apply also to the stator.

The disclosure further relates to an electric machine having the stator mentioned above, which consequently is produced with the method according to an aspect of the disclosure. The advantages of the method according to an aspect of the disclosure explained above therefore apply also to the electric machine according to an aspect of the disclosure. Besides the stator, the electric machine also includes a rotor which is rotatable about an axis of rotation relative to the stator.

Further important features and advantages of the disclosure are obtained from the claims, from the drawings, and from the associated figure description by way of the drawings.

It is to be understood that the features mentioned above and still to be explained in the following cannot only be used in the respective combination stated but also in other combinations or by themselves without leaving the scope of the present disclosure.

BRIEF DESCRIPTION OF THE DRAWINGS

The disclosure will now be described with reference to the drawings wherein:

FIGS. 2A, 2B, and 2C show the stator shown in FIGS. 1A and 1B following the carrying out of step b) in different representations, FIGS. 3A, 3B, and 3C show the stator shown in FIGS. 2A, 2B, and 2C following the carrying out of step c) in different representations, FIGS. 5A, 5B, and 5C show the stator shown in FIGS. 2A, 2B, and 2C following the carrying out of step e) in different representations.

DESCRIPTION OF EXEMPLARY EMBODIMENTS

Figure 1A:
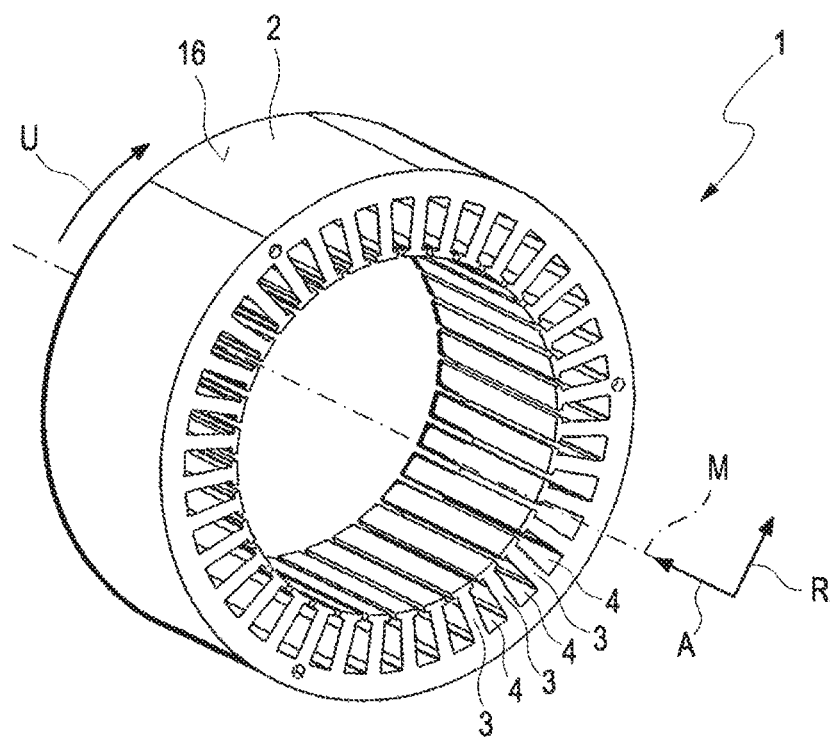
FIGS. 1A and 1B show a stator provided in step a) of the method in different representations.

FIG. 1A illustrates in perspective representation a stator 1 with an annular stator body 2, provided in step a) of the method according to an aspect of the disclosure. As is evident from FIG. 1A, multiple stator teeth 3 for receiving stator windings (not shown in FIG. 1) which are arranged spaced from one another along a circumferential direction U of the annular stator body 2 protrude from the stator body 2 radially to the inside.

Figure 1B:
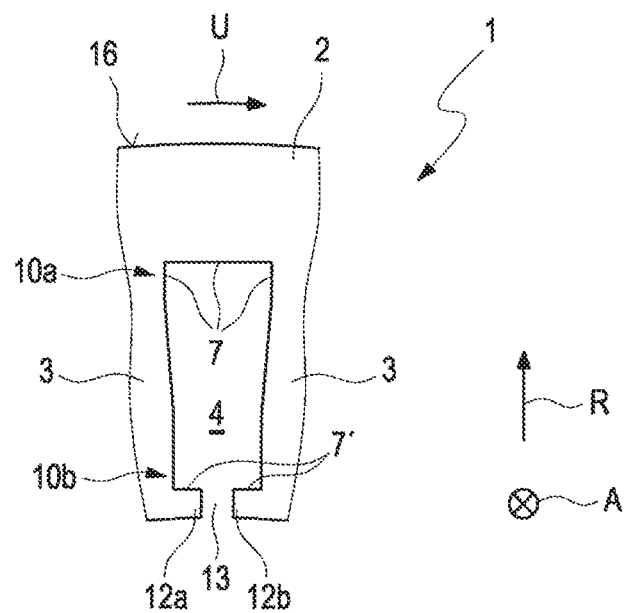

Between two stator teeth 3 that are adjacent in the circumferential direction U, an intermediate space 4 is formed in each case, which is also familiar to a person skilled in the art under the term "stator slot". FIG. 1B shows a detail representation of the stator body 2 of FIG. 1A in a detailed representation in the region of two stator teeth 3 that are adjacent in the circumferential direction U and in a plan view along an axial direction A, which extends along a center longitudinal axis M of the stator body 2 and thus runs perpendicularly to the circumferential direction U. A radial direction R extends perpendicularly away from the center longitudinal axis and thus runs orthogonally both to the axial direction A and also to the circumferential direction U.

At an end portion facing away from the stator body 2, each stator tooth 3 can include an extension 12a and 12b protruding from the stator tooth 3 in the circumferential direction U and also against the circumferential direction U, such that in each case two extensions 12a and 12b located opposite one another in the circumferential direction U of two stator teeth 3 adjacent in the circumferential direction U partly bound the intermediate space 4 while forming a passage slot 13 radially inside.

In a further method step b), the stator teeth 3 are overmolded with a first plastic mass K1. FIGS. 2A and 2B show the stator body 2 following the carrying out of the method step b) in a representation corresponding to the FIGS. 1A and 1B. For illustration, FIG. 2C shows a detailed representation of FIG. 2A, multiple adjacent stator teeth 3.

Following the overmolding with the first plastic mass K1 according to step b) and prior to fixing of the stator windings 5 according to step d), a first mask 6a is introduced in each case between the two stator teeth 3 into a radially outer end portion 10a of the intermediate spaces 4. Typically, the first mask 6a completely fills out the radially outer end portion 10a. Thus, the volume of the intermediate space 4 filled out by the first mask 6a for forming a cooling passage 9 remains free of this second plastic mass K2 in the step d) still to be carried out later on, i.e., during the overmolding with the second plastic mass K2.

Practically, the first mask 6a can cover a surface portion 7 of the stator body 2 bounding the intermediate space 4 radially outside, which in step b) can have been partly or completely covered with the first plastic mass K1. In this way it is prevented that the surface portion, in the method step d) still to be carried out later on, is covered with the second plastic mass K2.

In a further method step c), stator windings 5 are arranged on the stator teeth 3. This is rough-schematically shown in the FIGS. 3A, 3B, and 3C, which show the stator body 2 following the carrying out of the method step c) in a representation corresponding to the FIGS. 2A, 2B, and 2C.

Figure 4A:
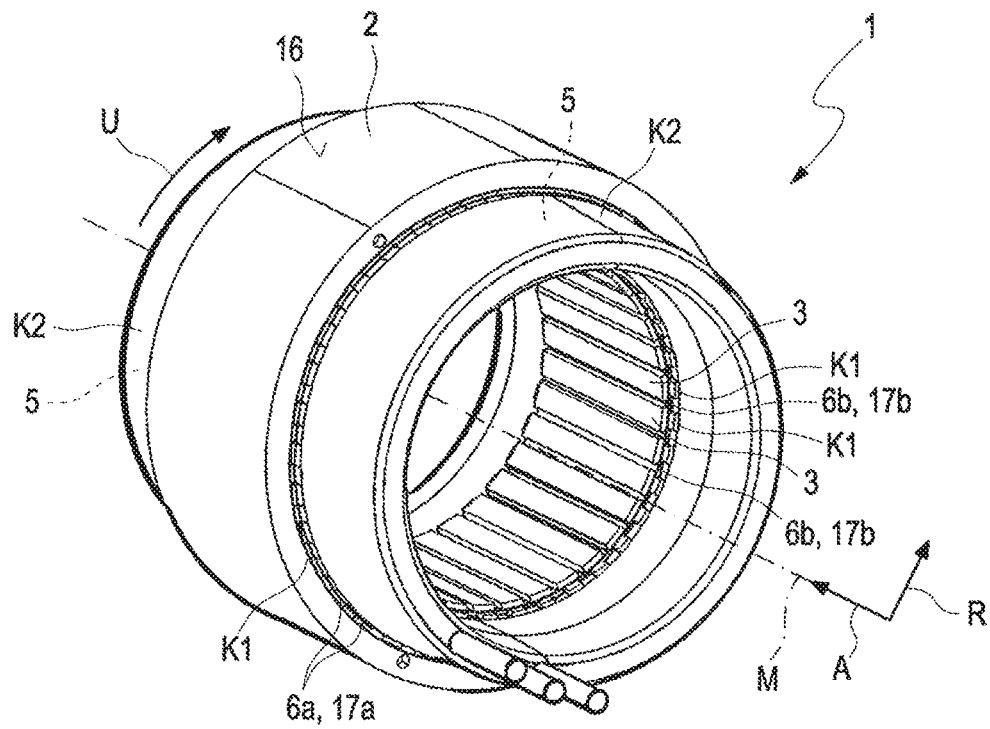
FIGS. 4A, 4B, and 4C show the stator shown in FIGS. 2A, 2B, and 2C following the carrying out of step d) in different representations.
Figure 4C:
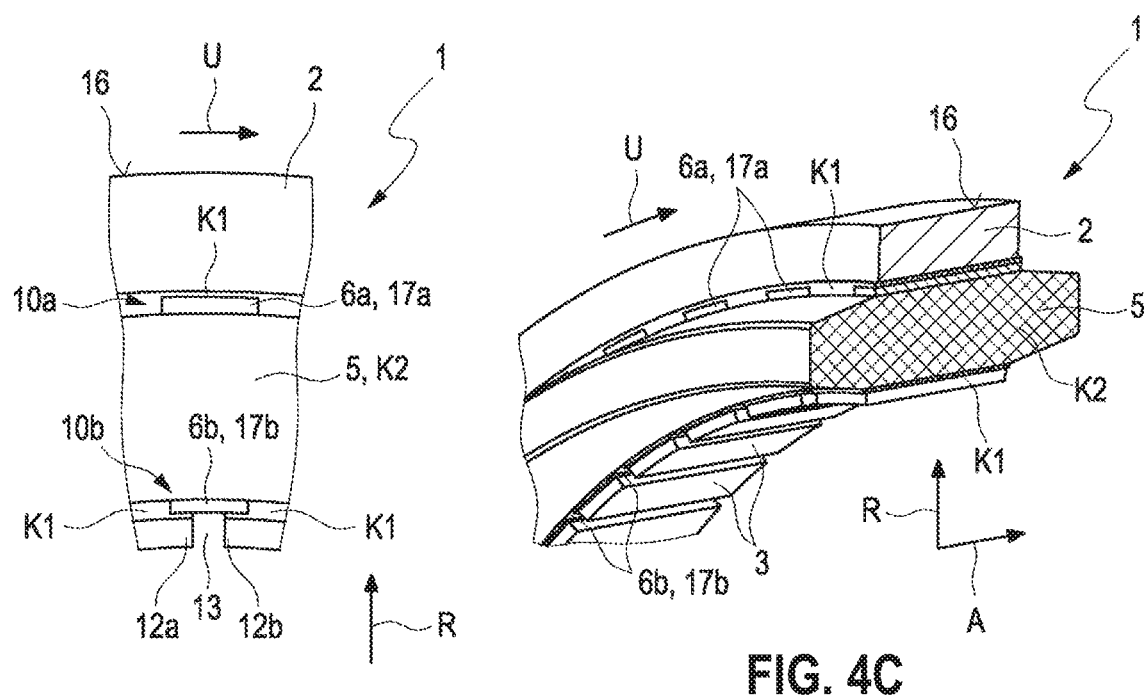
Figure 4B:

In a further method step d), the stator windings 5 are fixed to the stator teeth 3 through at least partial overmolding with a second plastic mass K2. This is rough-schematically shown in the FIGS. 4A, 4B, and 4C, which shows the stator body 2 in a representation corresponding to the FIGS. 3A, 3B, and 3C. The volume filled out by the first masks 6a remains, as explained above, free of second plastic mass K2. The first masks 6a cover a surface portion 7 of the stator body 2 which bounds the intermediate space 4 radially outside, which in step b) can have already been partly or completely covered with the first plastic mass K1. In this way it is prevented that the surface portion 7, in the step d) still to be carried out later on, is covered with the second plastic mass K2. Following the overmolding with the second plastic mass K2, the first masks 6a are again removed from the intermediate spaces 4 in a method step e), so that following the removal of the masks 6a a hollow space 8 that is present in each case can form a coolant passage 9 for coolant to flow through.

Optionally, following the overmolding with the first plastic mass K1 according to step b) and prior to the fixing of the stator windings 5 according to step d), a second mask 6b can also be introduced into a radially inner end portion 10b of the respective intermediate space 4. Thus, the volume of the intermediate space 4 filled out by the second mask 6b for forming an additional cooling passage 9' during the overmolding according to step d) remains free of the second plastic mass K2. Analogously to the first masks 6a, the second masks 6b can each cover a surface portion 7' of the two stator teeth 3 bounding the intermediate space 4 radially inside which in step b) can already have been partly or completely covered with the first plastic mass K1. Thus, it is prevented that the surface portion 7' in step d) is not covered with the second plastic mass K2.

Analogously to the first masks 6a, the second masks 6b, following the overmolding with the second plastic mask K2, can be again removed from the passage slots 13, such that hollow spaces 8' formed after the removal of the respective second mask 6b each form an additional coolant passage 9' for coolant to flow through.

In a further method step f), the second plastic mass K2 bounding the hollow space 8 or coolant passage 9, the stator windings 3 fixed to the stator teeth 2 with the second plastic mass K2 and the surface portions 7 of the stator body 2 covered by these prior to the removal of the first masks 6a are overmolded with a third plastic mass K3. Step f) is carried out after the removal of the first masks 6a. Typically, the overmolding with the third plastic mass K3 as part of step f) is carried out in such a manner that the hollow spaces 8 or coolant passages 9 after the overmolding with the third plastic mass K3 are exclusively bounded by the third or first plastic mass K3 and K1.

In this case, formed hollow spaces 8 or coolant passages 9 are exclusively bounded by the first or third plastic mass K1 and K3, such that the desired electrical insulation of the stator body 2 relative to the coolant flowing through the coolant passages 9 is ensured. It is possible, in particular, that the additional coolant passages 9' are exclusively bounded by the third and the first plastic mass K3 and K1.

During the course of the production method explained here, the second plastic mass K2 bounding the additional coolant passages 9', the stator windings 5 fixed to the stator teeth 3 with the second plastic mass K2 and the surface portions 7' of the stator teeth 3 covered by the second masks 6b prior to the removal of the same, can be overmolded with a third plastic mass K3. Here, the overmolding is carried out in such a manner that the additional coolant passages 9', after the overmolding with the third plastic mass K3, are exclusively bounded by the third and the first plastic mass K3 and K1.

Analogously to the coolant passages 9, the additional coolant passages 9' are also exclusively bounded by the first or third plastic mass K3. It is possible, in particular, that the additional coolant passages 9' are exclusively bounded by the third plastic mass K3.

Figure 6A:
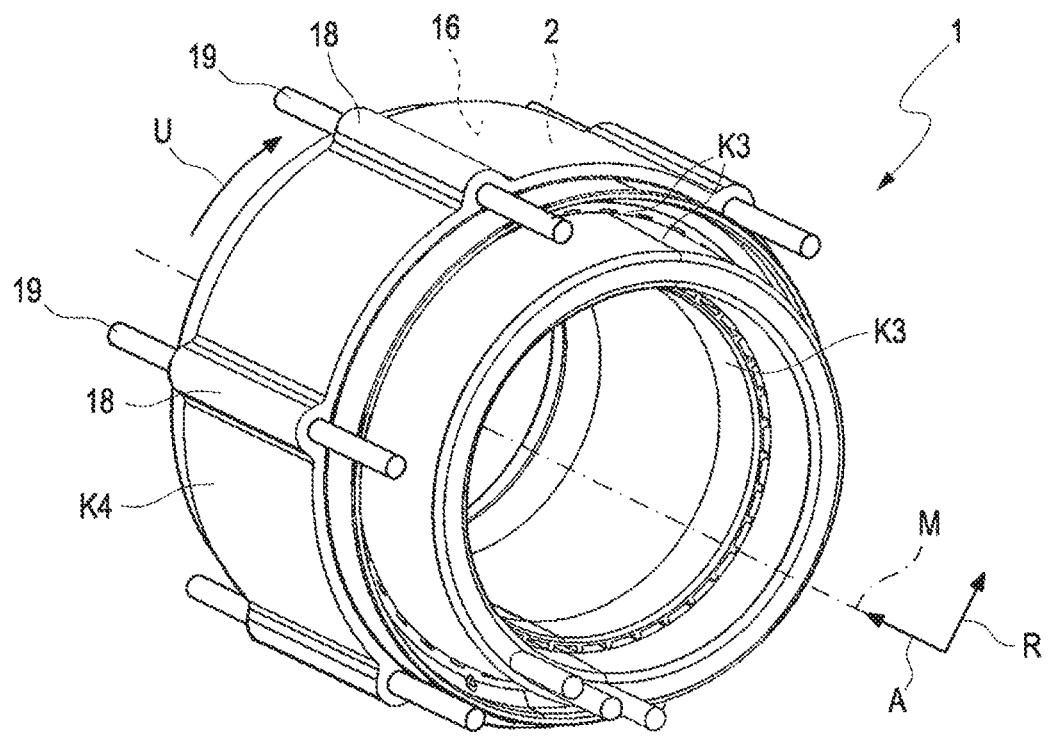
FIGS. 6A and 6B show the stator shown in FIGS. 2A, 2B, and 2C following the carrying out of step e) in different representations.
Figure 6B:
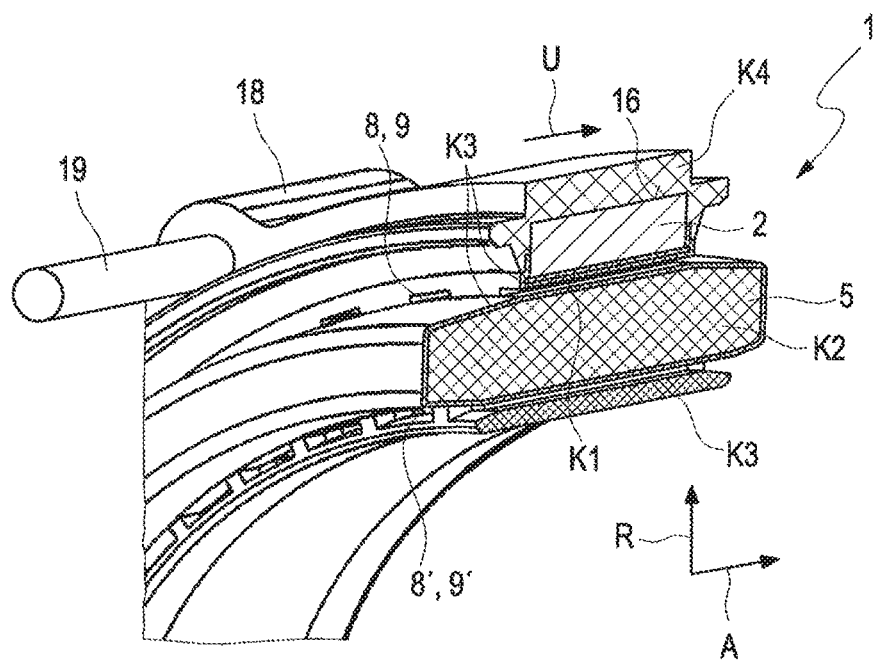

In other words, the overmolding with the third plastic mass K3 is particularly practically carried out in such a manner that following the overmolding, the hollow spaces 8 and 8' or the coolant passages 9 and 9' are not directly bounded by the stator windings or by the stator body 2 at any point. In a further method step, at least one outer circumferential side 16 of the stator body 2 can be overmolded with a fourth plastic mass K4. This is shown in the FIGS. 6A and 6B, the representations of which correspond to the FIGS. 5A and 5B. During the course of the overmolding with the fourth plastic mass K4, axially extending extensions 18 provided on the outer circumferential side 16 of the stator body 2 as indicated in the FIGS. 6A and 6B, from which axially on the end side in each case threaded rods 19 for fastening a respective bearing shield to the stator body 2 protrude, can likewise be overmolded with the fourth plastic mass K4.

In a further optional method step, two bearing shields can be fastened to the stator body along the axial direction A located opposite with the overmolded threaded rods 19. This is shown for two versions that are alternative to one another in the FIGS. 7A and 7B. In both versions, a first bearing shield 20a thus seals a first hollow space 21 provided in the third and fourth plastic mass K3 and K4, which forms a coolant distributor 22a and for this purpose fluidically communicates with the cooling passages 9 and 9' that are present in the stator 1. A second bearing shield (not shown) seals a second hollow space (not shown) formed in the third and fourth plastic mass K3 and K4, which forms a coolant collector (not shown) and for this purpose fluidically communicates with the cooling passages 9 and 9' formed in the stator 1. The two bearing shields according to FIGS. 7A and 7B lie opposite one another along the axial direction A and axially bound the stator body 2 of the stator 1.

Figure 7A:
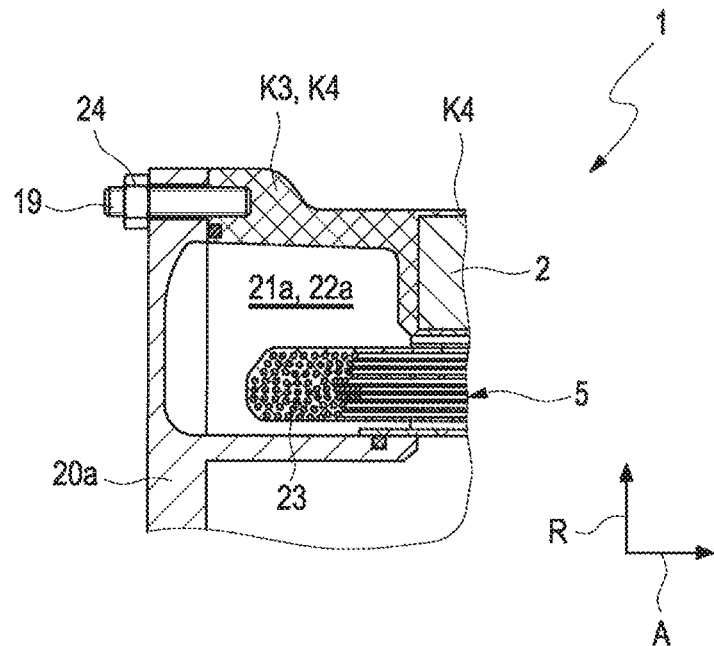
FIGS. 7A and 7B show two versions that are alternative to one another illustrating the method step h).
Figure 7B:
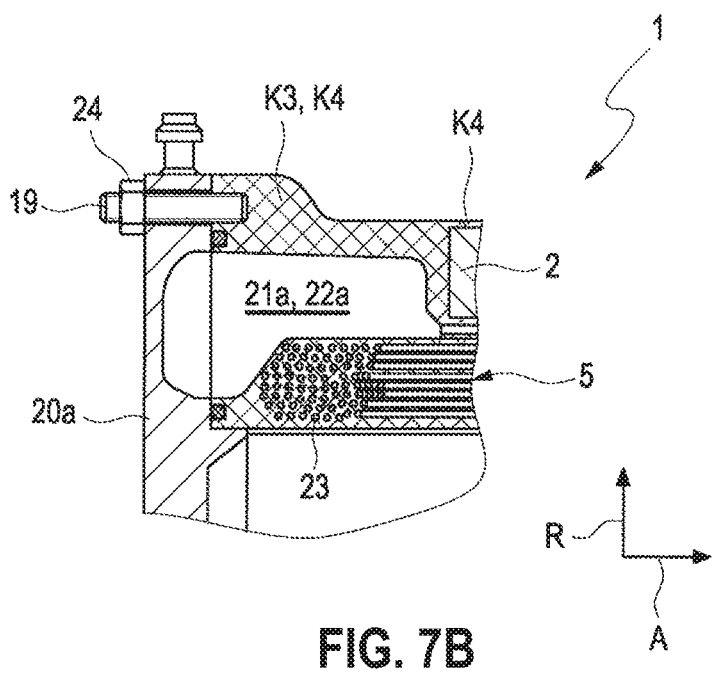

In the longitudinal section of the stator 1 along the axial direction A according to FIG. 7A, the coolant distributor 22a and the coolant collector each have a U-shaped geometry which partly surround a respective axial end portion 23 of the stator windings 5 in the axial extension and radially outside and radially inside. In the longitudinal section of the stator 1 along the axial direction A according to FIG. 7, the coolant distributor 22a and the coolant collector each have an I-shaped geometry, which partly surround a respective axial end portion of the stator windings 5 in the axial extension and radially outside. The fastening of the bearing shields 28 to the stator body 2 is carried out with the already mentioned threaded rods 19 provided on the stator body 2 together with threaded nuts 24 matched to these threaded rods 19. The first and the second masks 6a and 6b can each be formed as an insert 17a and 17b formed plate-like or platelet-like, or of a steel.

In a first version of the example, the plastic material of the first and second and third plastic mass K1, K2, and K3 include thermosetting plastics or consist of the same thermosetting plastics. Compared with this, the plastic material of the fourth plastic mass K4 is a thermoplastic that is distinct from the thermosetting plastics of the first, second and third plastic mass. The heat conductivity of the fourth plastic mass K4 in this version is lower than the heat conductivity of the first, second, and third plastic mass K1, K2, and K3. Apart from this, the strength of the fourth plastic mass K4 in this exemplary embodiment is higher than the strength of the first, second, and third plastic mass K1, K2, and K3.

In a second version of the example, the plastic material of the first and of the third plastic mass K1 and K3 includes the same thermosetting plastic or consists of the same thermosetting plastic, whereas it is distinct from the plastic material of the second and of the fourth plastic mass K2 and K4. In this version, the plastic material of the second plastic mass K2 is distinct from the plastic material of the fourth plastic mass K4. In this version, a coolant resistance of the first and third plastic mass K1 and K3 is greater in each case than a coolant resistance of the second plastic mass K2. Furthermore, the heat conductivity in this version of the first and third plastic mass K1 and K3 is lower in each case than the heat conductivity of the second plastic mass K2. Finally, alternatively or additionally, the strength of the fourth plastic mass K4 in this version of the example is higher than the strength of the first, second, and third plastic mass K1, K2, and K3. A layer thickness of the third and first plastic mass K3 and K1 in this version of the example amounts to a maximum of 0.8 mm, typically a maximum of 0.3 mm.

In this version, a coolant resistance of the first and third plastic mass K1 and K3 is higher in each case than a coolant resistance of the second and the third plastic mass K2 and K4. Apart from this, the heat conductivity of the second plastic mass K2 in this further development is higher than the heat conductivity of the first, third and/or fourth plastic mass K1, K3, and K4. Alternatively or additionally, the strength of the fourth plastic mass K4 in this further development is higher than the strength of the first and/or second and/or third plastic mass K1, K2, and K3.

According to an optional method step, the second plastic mass K2 initially bounding the coolant distribution space 22a and the coolant collector space 22b can be overmolded and/or sprayed with an electrically insulating insulation material. Likewise, axial end portions of the stator windings 6, which can protrude on both sides from the respective intermediate space 4 along the axial direction A, can be overmolded and/or sprayed with the electrically insulating insulation material. Practically, an electrically insulating varnish is used for this purpose. However, it is also conceivable to use the third plastic mass K3 and/or the fourth plastic mass K4 or another suitable plastic mass. The overmolding, spraying is carried out in such a manner that following the overmolding or spraying, neither the second plastic mass K2 nor the axial end portions of the stator windings 5 directly bound the coolant distribution space 22a or the coolant collector space 22b. In this way, an undesirable electrical connection of the electrically conductive stator windings 6 with the coolant that is present in the coolant distribution space 22 or coolant collection space 22b is excluded.

During the course of step d) or offset in time thereto, i.e., prior to the carrying out of step d) or after the carrying out of step d), the axial end portions of the stator windings 5 can also be fixed to the respective stator tooth 3 with a plastic mass, in particular with the second plastic mass K2.

It is understood that the foregoing description is that of the exemplary embodiments of the disclosure and that various changes and modifications may be made thereto without departing from the spirit and scope of the disclosure as defined in the appended claims.

What is claimed is:

1. A method for producing a stator for an electric machine, the method comprising:
   (a) providing a stator, which comprises an annular stator body, from which multiple stator teeth for receiving stator windings that are arranged spaced from one another along a circumferential direction of the stator body protrude radially to the inside, wherein between two stator teeth adjacent in the circumferential direction, an intermediate space is formed in each case;
   (b) at least partial overmolding at least two stator teeth that are adjacent in the circumferential direction with a first plastic mass;
   (c) arranging at least one stator winding on at least one stator tooth;
   (d) fixing the at least one stator winding on the at least one stator tooth through at least partial overmolding of this stator winding with a second plastic mass; and
   following the overmolding with the first plastic mass according to step (b) and prior to the fixing of the at least one stator winding according to step (d), introducing a first mask into the intermediate space between the two stator teeth, such that the volume of the intermediate space filled out by the first mask for forming a coolant passage cooling passage remains free of the second plastic mass during the overmolding according to step (d), wherein the first mask covers a surface portion of the stator body bounding the intermediate space radially outside, which can have been partly or completely covered with the first plastic mass in step (b), such that the surface portion during the overmolding according to step (d) is not covered with the second plastic mass.

2. The method according to claim 1, further comprising: introducing the first mask into a radially outer end portion of the intermediate space.

3. The method according to claim 2, wherein the first mask completely fills out the radially outer end portion.

4. The method according to claim 1, further comprising:
(e) removing the first mask from the intermediate space following the overmolding with the second plastic mass, such that a hollow space that is present following the removing of the first mask forms a coolant passage for a coolant to flow through.

5. The method according to claim 4, further comprising:
(f) overmolding of the second plastic mass bounding the hollow space or the coolant passage and/or of the stator winding fixed to the stator tooth with the second plastic mass and/or of the surface portion of the stator body covered by the first mask prior to the removal of the same with a third plastic mass.

6. The method according to claim 5, further comprising: carrying out the overmolding with the third plastic mass after the removing of the first mask.

7. The method according to claim 5, wherein the coolant passage is bounded by the first and/or the third plastic mass.

8. The method according to any claim 5, further comprising:
carrying out the overmolding with the third plastic mass such that following the overmolding the overmolded hollow space and/or additional hollow space or coolant passage and/or additional coolant passage is not directly bounded by the stator winding and/or by the stator body at any point.

9. The method according to claim 8, further comprising:
(g) overmolding at least one outer circumferential side of the stator body with a fourth plastic mass.

10. The method according to claim 9, wherein at least one of the first plastic mass, the second plastic mass, the third plastic mass, and the fourth plastic mass comprises a thermosetting plastic or is/are a thermosetting plastic.

11. The method according to claim 9, wherein at least one of the first plastic mass, the second plastic mass, the third plastic mass, and the fourth plastic mass comprises a thermoplastic or is a thermoplastic.

12. The method according to claim 9, wherein:
the plastic material of the first, second, and third plastic mass comprises the same thermosetting plastic or consists of the same thermosetting plastic, and
the plastic material of the fourth plastic mass is a thermoplastic that is distinct from the thermosetting plastic of the first, second, and third plastic mass.

13. The method according to claim 12, wherein the heat conductivity of the fourth plastic mass is lower than the heat conductivity of the first and/or second and/or third plastic mass, and/or in that the strength of the fourth plastic mass is higher than the strength of the first and/or second and/or third plastic mass.

14. The method according to claim 9, wherein:
the plastic material of the first and of the third plastic mass comprises the same thermosetting plastic or consists of the same thermosetting plastic and is distinct from the plastic material of the second and the fourth plastic mass, and
the plastic material of the second plastic mass is distinct from the plastic material of the fourth plastic mass.

15. The method according to claim 14, wherein at least one of:
a coolant resistance of at least one of the first plastic mass and the third plastic mass is higher than the coolant resistance of at least one of the second plastic mass and the fourth plastic mass,
the heat conductivity of at least one of the first plastic mass and the third plastic mass is lower than the heat conductivity of the second plastic mass, and
the strength of the fourth plastic mass is higher than the strength of at least one of the first plastic mass, the second plastic mass, and the third plastic mass.

16. The method according to claim 14, wherein a layer thickness of at least one of the third plastic mass and the first plastic mass bounding the respective coolant passage amounts to at least one of a maximum of 0.8 mm, or a maximum of 0.3 mm.

17. The method according to claim 9, wherein the plastic materials of the first, second, third, and fourth plastic mass comprise different thermoplastics or thermosetting plastics or consist of different thermoplastics or thermosetting plastics.

18. The method according to claim 17, wherein at least one of:
a coolant resistance of at least one of the first plastic mass and the third plastic mass is higher than a coolant resistance of the second plastic mass,
the heat conductivity of the second plastic mass is higher than the heat conductivity of at least one of the first plastic mass, the third plastic mass, and the fourth plastic mass, and
the strength of the fourth plastic mass is higher than the strength of at least one of the first plastic mass, the second plastic mass, and the third plastic mass.

19. The method according to claim 9, wherein the method further comprises:
(h1) providing a coolant distribution space and a coolant collection space on and/or in the stator, which via the at least one coolant passage and/or via the at least one additional coolant passage fluidically communicate with one another; and
(h2) at least one of overmolding and spraying of the second plastic mass bounding at least one of the coolant distribution space, the coolant collection space, and the axial end portions of at least one stator winding, or of all stator windings, with an electrically insulating insulation material, or an electrically insulating varnish.

20. The method according to claim 19, wherein the overmolding or spraying according to step (h2) is carried out in such a manner that following the overmolding or spraying, neither the second plastic mass nor the axial end portions of the at least one stator winding, or of stator windings, bound the coolant distribution space or the coolant collection space.

21. The method according to claim 19, wherein in step (d), the axial end portions of the at least one stator winding are also fixed to the at least one stator tooth with the second plastic mass.

22. A method for producing a stator for an electric machine, the method comprising:
  (a) providing a stator, which comprises an annular stator body, from which multiple stator teeth for receiving stator windings that are arranged spaced from one another along a circumferential direction of the stator body protrude radially to the inside, wherein between two stator teeth adjacent in the circumferential direction, an intermediate space is formed in each case;
  (b) at least partial overmolding at least two stator teeth that are adjacent in the circumferential direction with a first plastic mass;
  (c) arranging at least one stator winding on at least one stator tooth;
  (d) fixing the at least one stator winding on the at least one stator tooth through at least partial overmolding of this stator winding with a second plastic mass;
  following the overmolding with the first plastic mass according to step (b) and prior to the fixing of the at least one stator winding according to step (d), introducing a first mask into the intermediate space between the two stator teeth, such that the volume of the intermediate space filled out by the first mask for forming a coolant passage remains free of the second plastic mass during the overmolding according to step (d); and
  following the overmolding with the first plastic mass according to step (b) and prior to the fixing of the at least one stator winding according to step (d), introducing a second mask in a radially inner end portion of the intermediate space, such that the volume of the intermediate space filled out by the second mask, remains free of the second plastic mass during the overmolding according to step (d) for forming an additional coolant passage.

23. The method according to claim 22, wherein the second mask covers a surface portion of the stator teeth bounding the intermediate space radially inside, which can have been partly or completely covered with the first plastic mass in step (b), such that the surface portion in step (d) is not covered with the second plastic mass.

24. The method according to claim 22, further comprising:
  (e1) removing the second mask from the intermediate space after the overmolding with the second plastic mass, such that a hollow space that is present following the removing of the second mask, forms an additional coolant passage for a coolant to flow through.

25. A method for producing a stator for an electric machine, the method comprising:
  (a) providing a stator, which comprises an annular stator body, from which multiple stator teeth for receiving stator windings that are arranged spaced from one another along a circumferential direction of the stator body protrude radially to the inside, wherein between two stator teeth adjacent in the circumferential direction, an intermediate space is formed in each case;
  (b) at least partial overmolding at least two stator teeth that are adjacent in the circumferential direction with a first plastic mass;
  (c) arranging at least one stator winding on at least one stator tooth;
  (d) fixing the at least one stator winding on the at least one stator tooth through at least partial overmolding of this stator winding with a second plastic mass;
  following the overmolding with the first plastic mass according to step (b) and prior to the fixing of the at least one stator winding according to step (d), introducing a first mask into the intermediate space between the two stator teeth, such that the volume of the intermediate space filled out by the first mask for forming a coolant passage remains free of the second plastic mass during the overmolding according to step (d);
  following the overmolding with the first plastic mass according to step (b) and prior to the fixing of the at least one stator winding according to step (d), introducing a second mask in a radially inner end portion of the intermediate space, such that the volume of the intermediate space filled out by the second mask, remains free of the second plastic mass during the overmolding according to step (d) for forming an additional coolant cooling passage;
  (f) overmolding of the second plastic mass bounding the hollow space or the coolant passage and/or of the stator winding fixed to the stator tooth with the second plastic mass and/or of the surface portion of the stator body covered by the first mask prior to the removal of the same with a third plastic mass; and
  carrying out the overmolding with the third plastic mass after the removing of the first mask.

* * * * *